United States Patent
Nelson, Jr.

(10) Patent No.: US 6,297,727 B1
(45) Date of Patent: *Oct. 2, 2001

(54) TRANSPONDER IDENTIFICATION AND RECORD ASSEMBLY

(76) Inventor: George N. Nelson, Jr., 1777 Knox Ave S., Minneapolis, MN (US) 55403

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/851,114

(22) Filed: May 5, 1997

(51) Int. Cl.[7] ....................................................... H04Q 5/22
(52) U.S. Cl. ................... 340/10.1; 340/10.3; 340/572.1; 342/37
(58) Field of Search ........................ 623/11; 340/852.54, 340/825.31, 825.34, 572.1, 568, 825.49; 235/382, 380, 487, 462, 384; 380/25; 283/36, 41, 42, 81, 117, 101, 901, 76; 40/299; 342/37

(56) References Cited

U.S. PATENT DOCUMENTS

| | | |
|---|---|---|
| 3,445,633 | 5/1969 | Ratner .................................. 235/61.7 |
| 3,622,995 | 11/1971 | Hopskin et al. ...................... 340/153 |
| 4,114,151 | 9/1978 | Denne et al. . |
| 4,129,855 | 12/1978 | Rodrian . |
| 4,208,795 | 6/1980 | Mühlemann et al. . |
| 4,262,632 | 4/1981 | Hanton et al. . |
| 4,325,146 | 4/1982 | Lennington . |
| 4,364,043 | 12/1982 | Cole et al. . |
| 4,459,590 | 7/1984 | Saulnier . |
| 4,463,353 | 7/1984 | Kuzara . |
| 4,463,706 | 8/1984 | Meister et al. . |
| 4,475,481 | 10/1984 | Carroll . |
| 4,535,557 | 8/1985 | Porcher . |
| 4,711,994 | 12/1987 | Greenberg ............................ 235/384 |
| 4,785,563 | 11/1988 | Friedman . |
| 4,829,558 | 5/1989 | Welsh . |
| 4,854,328 | 8/1989 | Pollack . |
| 4,857,893 | 8/1989 | Carroll . |
| 4,881,061 | * 11/1989 | Chambers ............................ 340/568 |
| 5,028,918 | 7/1991 | Giles et al. . |
| 5,041,826 | 8/1991 | Milheiser . |
| 5,150,114 | 9/1992 | Johansson . |
| 5,249,827 | * 10/1993 | Olson .................................... 283/36 |

(List continued on next page.)

OTHER PUBLICATIONS

U.S. application No. 08/852,182, Nelson et al., filed May 5, 1997.

*Primary Examiner*—Howard L. Williams
*Assistant Examiner*—Jean Bruner Jeanglaude
(74) *Attorney, Agent, or Firm*—Faegre & Benson LLP (57) ABSTRACT

Transponder identification record assembly is suitable for associating an identification code with a code recipient and for maintaining an independent record of the identification code associated with the code recipient. The assembly includes a carrier element, a patch, and a data record. The patch is releasably disposed on the carrier element and is further provided with an adhesive coating so that the patch is adherable to the code recipient after the patch is removed from the carrier element. The patch also includes a transponder which stores information such as an identification code. The transponder can be remotely interrogated to obtain the identification code. The data record is disposed on the carrier element separate from the patch. The data record includes at least a copy of the identification code such that, after the patch is removed from the carrier element and adhered to the code recipient, the carrier element bearing the data record can be separately stored. The separately stored carrier element thereby provides a tangible separate record of the identification code associated with the code recipient. The information may be transferred to and stored in a database.

52 Claims, 6 Drawing Sheets

U.S. PATENT DOCUMENTS

| | | | |
|---|---|---|---|
| 5,300,120 | * 4/1994 | Knapp et al. | 623/11 |
| 5,339,051 | 8/1994 | Koehler et al. . | |
| 5,353,011 | * 10/1994 | Wheeler et al. | 340/572 |
| 5,358,514 | 10/1994 | Schulman et al. . | |
| 5,499,626 | 3/1996 | Willham et al. . | |
| 5,504,321 | 4/1996 | Sheldon | 235/492 |
| 5,511,553 | 4/1996 | Segalowitz . | |
| 5,519,200 | 5/1996 | Williams | 235/487 |
| 5,525,991 | 6/1996 | Nagura et al. . | |
| 5,587,575 | 12/1996 | Leitner et al. | 235/384 |
| 5,621,203 | 4/1997 | Swartz et al. . | |
| 5,621,204 | 4/1997 | Yu . | |
| 5,621,647 | 4/1997 | Kraemer et al. . | |
| 5,623,347 | 4/1997 | Pizzanelli . | |

* cited by examiner

TRANSPONDER IDENTIFICATION AND RECORD ASSEMBLY

FIELD OF THE INVENTION

This invention relates to an assembly for associating a code recipient, such as an object, animal, or human, with a unique identification code. More specifically, this invention relates to such an assembly in which the unique identification code is stored in the memory of a transponder.

BACKGROUND OF THE INVENTION

A transponder is generally a compact, relatively inexpensive electronic device which includes a memory capable of storing a relatively small amount of data. Transponders having either reprogrammable or one-time programmable memories are known. With a reprogrammable memory, information stored in the memory can be changed and/or updated as often as desired. Additionally, information can be read from the memory as often as desired. A reprogrammable memory is also referred to in the art as a "read/write" type of memory. With a one-time programmable memory, on the other hand, information can be written to the memory only a single time. Thereafter, the stored information can be read from the memory as often as liked, but the information cannot be changed or updated. One-time programmable memories are often referred to in the art as "write once/read many" type of memories.

Transponders may include an internal power source or, alternatively, transponders can be parasitically powered. Internally powered transponders include an internal power supply, such as a battery, for powering transponder operations. The service life of such transponders is limited by the power supply. In contrast, parasitically powered, or passive, transponders do not have an internal power source. Instead, such transponders receive power from an external device such as an interrogation unit. Passive transponders potentially have a very long service life, because the service life of such transponders is not limited by the amount of power stored in an internal power supply.

In a typical transponder operation, an interrogation unit is used to transmit an interrogation signal to the transponder. An antenna incorporated into the transponder receives the interrogation signal. Circuitry processes the interrogation signal and develops a response signal whose content depends upon the transponder's programming and circuitry. After developing the response signal, the transponder then transmits the response signal back to the interrogation unit. Based upon the nature of the response signal, appropriate follow-up action can be taken. If the transponder is of the passive type, circuitry coupled to the antenna also converts the interrogation signal into an accumulated voltage. Such voltage is used to power transponder operations. Transponders have been widely described in the literature, including U.S. Pat. Nos. 5,150,114; 5,041,826; 4,463,706; 4,463,353; 4,459,590; 4,364,043; 4,325,146; 4,129,855; and 4,114,151.

A unique sequence of data bits corresponding to a specific identification code can be easily stored in the memory of a transponder. As a result of this characteristic, the electronic identification tags incorporating transponders have been used as a way to assign unique identification codes to various items or entities. For example, U.S. Pat. No. 5,028,918 describes the use of electronic identity tags for animal identification purposes, herd management, security systems, inventory control, process control, and monitoring the functions of an animal, such as feeding, body temperature and milk production. See also U.S. Pat. Nos. 5,499,626; 5,511,553; and 4,857,893.

It is often desirable when assigning a unique identification code to an object or entity to also create a separate data base record corresponding to the item or entity which contains information concerning the item or entity. To facilitate use of such records, the records may be correlated to the identification code so that the code can be used to access the record easily. Typically, such records are created separately from the step of attaching the identity tag to the object. Such an approach may be acceptable if only a few items are to be tagged, but can become more laborious as the number of items to be tagged increases. Additionally, creating records in a separate step increases the chances of errors occurring when correlating the record to the corresponding identification code. It would be desirable if a unique identification code can be associated with an object or entity while simultaneously creating a separate record of the association.

Transponders incorporating identification codes have been associated with human patients and animals using invasive techniques. For example, U.S. Pat. No. 5,499,626 describes an approach in which a transponder is subcutaneously injected into a human patient or an animal using a transponder injection device. With human patients in particular, it would be more desirable if the use of invasive techniques could be avoided.

Transponders incorporating identification codes have been associated with animals by incorporating a transponder onto a tag and then attaching the tag to the animal in some fashion. For example, U.S. Pat. No. 4,854,328 describes attaching such a tag to a hole punched through an animal's ear. Similarly, U.S. Pat. No. 4,463,706 shows attaching such a tag to a collar worn around an animal's neck. With these kinds of approaches, however, the transponders are associated with a particular tag at the outset. Little flexibility is offered to add an additional transponder to a tag if desired. Further, changing the transponder, if desired due to device failure for example, would require replacement of the entire tag. Further, it may be desirable to attach a transponder to an animal without damaging the animal or, in the case of livestock or other large animals, without requiring the animal to wear a collar.

SUMMARY OF THE INVENTION

The present invention advantageously allows the rapid association between code recipients and identification codes and the simultaneous creation of separate tangible records of the associations. In the practice of the present invention, the separate tangible records desirably also include substantive information relating to the code recipient so that the identification code can be used to obtain and update information concerning the code recipient as desired. According to the present invention, a "code recipient" is any item or entity to which an identification code is assigned. Code recipients could include humans, animals, and inanimate objects such as household items, business items, and the like.

Unlike previous approaches in which identification codes stored in transponders are associated with animals and/or humans using invasive means, the present invention allows identification codes and transponders to be associated with humans or animals non-invasively. Additionally, although the present invention allows transponders to be easily placed on tags, collars, or the like, the present invention also allows a transponder to be directly, noninvasively attached to a human or animal using an adhesive patch. The present invention also facilitates automated security in order to help and protect properties from being stolen. The present invention also assists in recovery of lost or stolen items.

In one aspect, the present invention provides a transponder identification record assembly suitable for associating an identification code with a code recipient and for maintaining an independent record of the identification code associated with the code recipient. The assembly includes a carrier element, a patch, and a data record. The patch is releasably disposed on the carrier element. The patch is provided with an adhesive coating, such that the patch is adherable to the code recipient after the patch is removed from the carrier element. The patch also comprises a transponder which stores information comprising the identification code. The transponder can be remotely interrogated to obtain the identification code. The data record is disposed on the carrier element at a position separate from the patch such that the data record is retained on at least a portion of the carrier element after the patch is removed from the carrier element. The data record includes information which comprises a copy of the identification code such that, after the patch is removed from the carrier element and adhered to the code recipient, the carrier element portion bearing the data record can be separately stored. The separately stored carrier element thereby provides a tangible separate record of the identification code associated with the code recipient.

In another aspect, the present invention relates to a method of providing a system suitable for associating the identification code with a code recipient while simultaneously maintaining an independent record of the identification code associated with the code recipient. In a first step an identification system is provided which includes a carrier element, a patch, and a data record as defined above. The patch is removed from the carrier element and adhered to the code recipient. The carrier element is then stored in a location separate from the code recipient to thereby provide a separate record of the identification code associated with the code recipient.

The present invention also relates to a method of providing a centralized system suitable for associating a plurality of identification codes with a plurality of corresponding code recipients and for maintaining a record of which identification code is associated with each code recipient. First, an identification system is provided which comprises a carrier element, a patch, and a data record as defined above. The patch is removed from the carrier element and adhered to the code recipient. A code recipient record is then inputted into a data base in a manner such that the identification code can be used to access the record.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein:

FIG. 1b is a bottom plan view of the transponder identification and record assembly of FIG. 1a.

FIG. 7b is a bottom plan view of the embodiment of FIG. 7a.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1A:
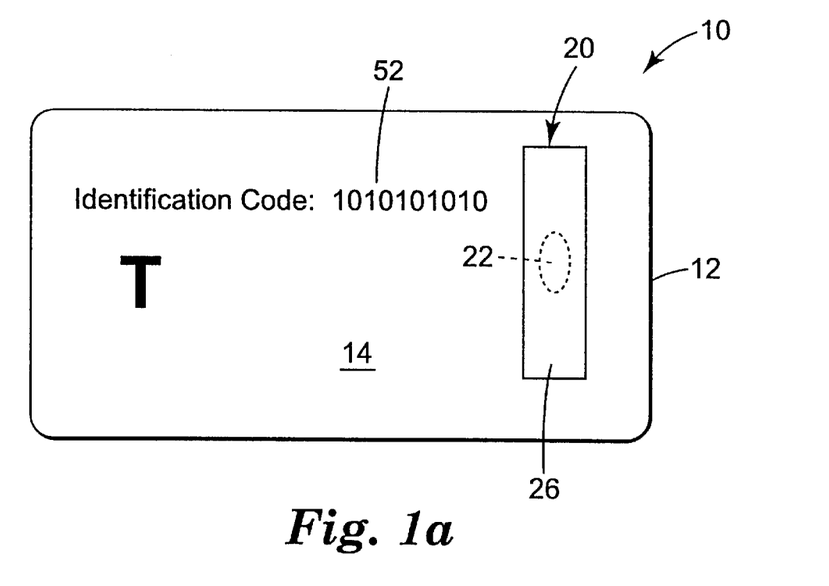
FIG. 1a is a top plan view of a transponder identification and record assembly of the present invention.
Figure 1B:
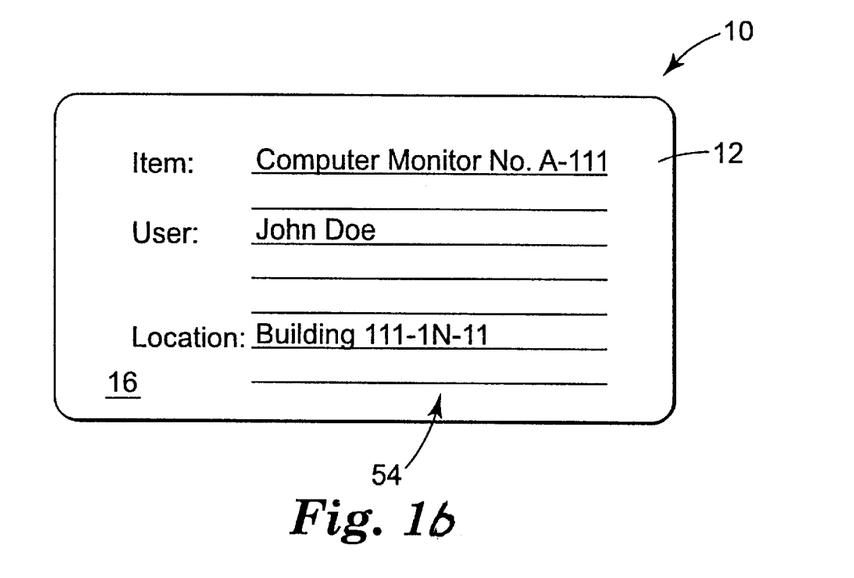
Figure 2:
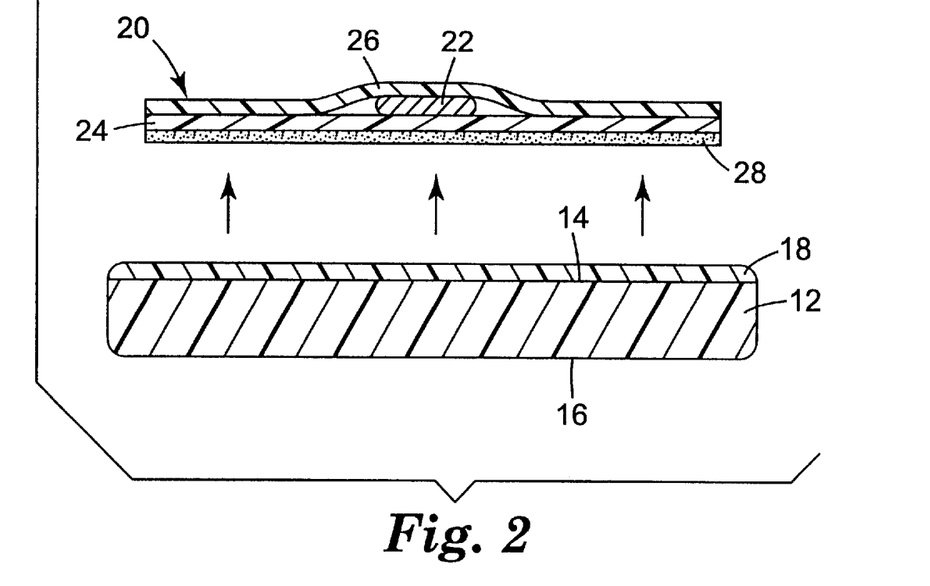
FIG. 2 is a side cross section view of the transponder identification and record assembly of FIGS. 1a and 1b.

FIGS. 1a, 1b, and 2 show one preferred embodiment of a transponder identification and record assembly 10 configured in accordance with the principles of the present invention. Transponder identification assembly 10 includes carrier element 12 having a first major surface 14 and a second major surface 16. Carrier element 12 is shown in a preferred configuration in which carrier element 12 is card-shaped so that carrier element 12 is readily and conveniently storable in a suitable storage container, such as a card file container or a "Rolodex" style file container. Carrier element is thus preferably formed from any material known to be suitable for forming such a card shaped object, and such materials include, for example, cardboard of the type used to form index cards or plastic material of the type used to form transaction cards. Advantageously, both cardboard and such plastic material are printable so that printed information, bar code information, graphics information, and/or the like can be applied to one or both major surfaces 14 and 16 as desired. Advantageously, such materials are also coatable with a suitable release coating, such as optional release coating 18 which is applied over first major surface 14, so that transponder patch 20 may be releasably disposed on first major surface 14.

Transponder patch 20 includes transponder 22 disposed on the top side of support 24. Protective cover 26 overlies transponder 22 and support 24 and is secured to support 24 in order to help retain transponder 22 in proper position. Protective cover 26 also helps protect transponder 22 against damage from scrapes, bumps, and the like. Support 24 and protective cover 26 can be made from a wide range of materials having any of a desired range of characteristics depending upon the nature of the substrate to which patch 20 is to be adhered. For example, if it is known that patch 20 will be adhered to relatively planar surfaces, such as computer equipment housings, artwork, television housings, packaging boxes, or the like, support 24 and protective cover 26 can be made from relatively rigid materials such as relatively thick metal sheeting, relatively rigid polymers, ceramic, wood, and the like. On the other hand, if patch 20 is to be readily adhered to nonplanar and/or flexible surfaces, such as piping, animals, human patients, convex and/or concave housings, or the like, then support 24 and protective cover 26 can be made from a flexible material such as paper, cardboard, relatively flexible polymers, fabric, thin metal sheeting, and the like. In other applications in which patch 20 is to be adhered to irregularly shaped items, then it may be desirable to form support 24 and protective cover 26 from an elastic polymeric material.

Adhesive coating 28 is disposed on the bottom side of support 24 and allows patch 20 to be adhered to a desired code recipient after patch 20 is removed from carrier element 12. In applications in which patch 20 is intended to have a long service life, adhesive coating 28 preferably comprises an adhesive which allows patch 20 to be adhered to a desired code recipient with an aggressive, long-lasting bond so that patch 20 is difficult to remove after being adhered to a desired substrate. For example, a pressure sensitive adhesive similar to the type of adhesive used on the bandaging material referred to as "mole skin" and/or to the type of adhesive used on duct tape, or the like, would be suitable in the practice of the present invention. In applications in which the code recipient may be exposed to humidity, aquatic environments, or other moisture, it would be desired that adhesive coating 28 comprises an adhesive which is water-resistant and/or waterproof.

In applications in which patch 20 is intended to be only in temporary use, e.g., if patch 20 is to be adhered to a patient during a hospital stay, then adhesive coating 28 desirably comprises a less aggressive adhesive, such as one of the types of adhesives used on conventional bandaging materials, so that patch 20 can be removed from the patient without undue discomfort when desired.

Although patch 20 is shown with a generally rectangular shape with transponder 22 in a centered position, patch 20 can be provided with other configurations if desired. For example, patch 20 could be square-shaped, elliptically-shaped, circularly-shaped, or irregularly-shaped. Additionally, depending upon the character of the corresponding code recipient, transponder 22 could be disposed in an off-centered position as well.

Transponder 22 includes a memory having storage capacity sufficient for storing information comprising data representative of an individual identification code. For purposes of illustration, the identification code associated with transponder 22 of the Figures is the ten bit binary word "1010101010". However, this particular code is only intended to be representative of one type of identification code useful in the practice of the present invention, and other coding approaches could be used. For example, depending upon factors such as the nature of the memory, or the overall storage capacity of the memory, or the total number of unique identification codes to be available, identification codes comprised of more or less than 10 bits of information may also be used in the practice of the present invention. Although most commonly stored in binary form, the identification code may be otherwise referred to by its corresponding alphanumeric form.

In addition to storing the identification code, additional storage capacity of the transponder memory, if any, may be used to store additional information such as transponder operational programming, coding, messages, user information, owner information, access information for accessing a database including records comprising information relating to a plurality of identification codes and corresponding code recipients, and the like. In the practice of the present invention, the memory of transponder 22 may be a read/write type of memory so that the information content of the memory can be reversibly stored in the memory and can be changed as many times and as often as desired. Alternatively, the memory of transponder 22 may be a write once/read many type of memory so that the information content of the memory is irreversibly stored in the memory and cannot be changed.

Figure 3:
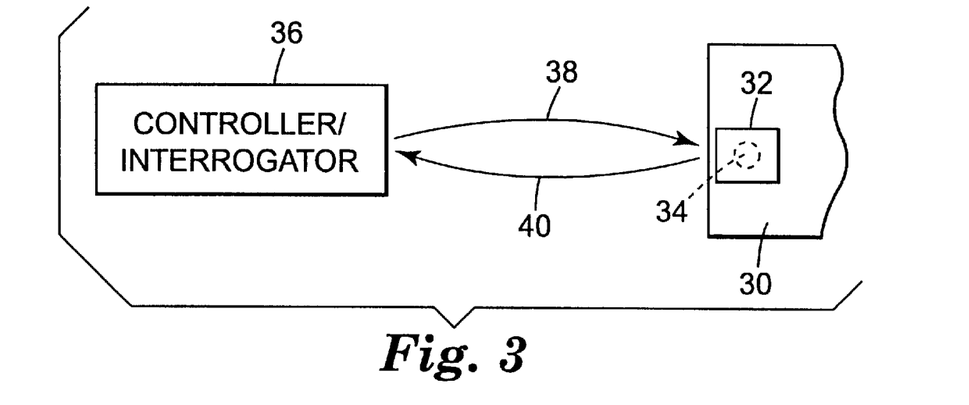
FIG. 3 is a schematic diagram showing how a transponder can be remotely read using an interrogator unit.

The identification code stored in the memory of transponder 22 becomes associated with a particular code recipient when patch 20 is adhered to that code recipient. Thereafter, the memory of transponder 22 can be remotely read using an interrogator unit in order to determine the identification code previously associated with the code recipient. This procedure is schematically shown in FIG. 3. Referring to FIG. 3, a code recipient 30 carries patch 32 containing a transponder 34. In order to determine information comprising the identification code stored in transponder 34 and associated with the code recipient 30, interrogator unit 36 transmits an interrogation signal 38 to transponder 34. After receiving and processing the interrogation signal 38, transponder 34 transmits response signal 40 back to the interrogation unit 36. Response signal 40 has encoded therein information comprising the identification code stored in the memory of transponder 34. Hence, by interrogating transponder 34, the identification code associated with code recipient 30, which could be a person, animal, or object, is easily determined.

Transponders suitable in the practice of the present invention, such as transponder 22 of FIGS. 1a, 1b, and 2 or transponder 34 of FIG. 3, may be internally powered, but then the service life of any such transponder would expire when the internal power supply is used up. Additionally, a transponder with an internal power source tends to be relatively expensive. Accordingly, in order to achieve a longer service life than would be available with internally powered transponders, and to minimize cost, a transponder used in the practice of the present invention is more preferably a so-called "parasitically powered", passive device which, rather than including an internal power supply, is parasitically powered by energy from an external device instead.

Figure 4:
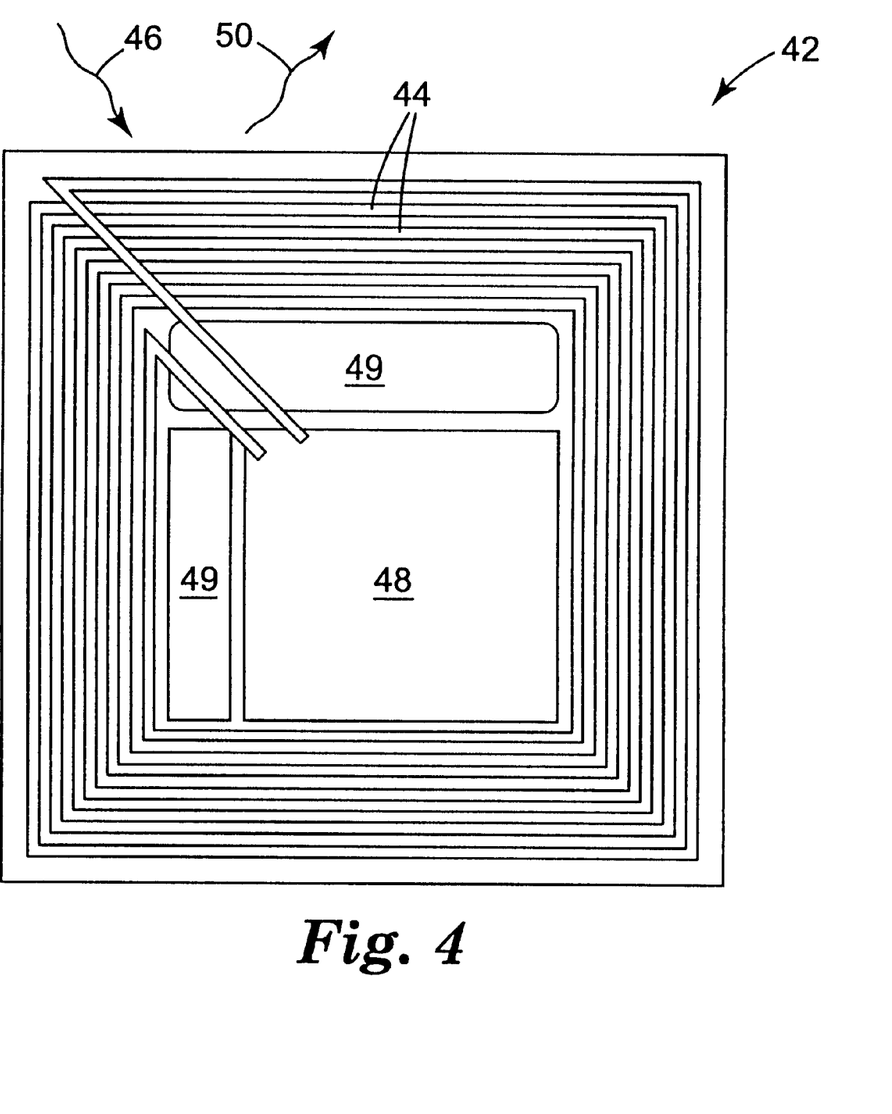
FIG. 4 is a schematic diagram of a passive transponder suitable in the practice of the present invention.

A representative example of one kind of parasitically powered, passive transponder 42 is schematically shown in FIG. 4. Transponder 42 includes an antenna 44, typically in the form of a coil, for receiving interrogation signal 46. Transponder 42 also includes an integrated circuit 48 operationally coupled to the coil. Integrated circuit 48 comprises circuitry for detecting interrogation signal 46 received by antenna 44, circuitry for converting interrogation signal 46 into a voltage for operating transponder 42, circuitry for generating response signal 50, and circuitry for coupling the transponder memory 49 to integrated circuit 48 so that data stored in the memory 49, such as the identification code, can be incorporated into response signal 50. Typically, response signal 50 is transmitted back to an interrogation unit (not shown) through antenna 44, which also serves as a transmitter as well as a receiver.

Parasitically powered, passive transponders are well known in the art, and a variety of such transponder models are commercially available from a variety of different vendors. Any such passive transponder could be conveniently used in the practice of the present invention. However, in health care applications in which a patch of the present invention, such as patch 20 of FIGS. 1a, 1b, and 2, is to be adhered to a human patient or to an animal, it may be desirable if the transponder is of the type which is encased in a non-toxic, biomedically acceptable material such as latex rubber, medical grade ABS, glass, or other material suitable for this purpose and which can be sterilizable by known means.

Passive transponders tend to be relatively small objects. For example, many fully operable transponders closely resemble a single grain of white rice in both size and shape. Other transponders are flat, planar structures having thicknesses of only 0.1 inches (0.254 cm), or less. Thus, with particular reference to FIG. 2, transponder 22, when characterized by such a small size, can be placed between support 24 and protective coating 26 without causing substantially any distortion in the planar surface characteristics of either support 24 or protective coating 26. In fact, in FIG. 2, the distortion resulting when protective coating 26 passes over and conforms to the underlying transponder 22 has been greatly exaggerated for purposes of illustration. Certainly, the actual, minor distortion resulting in practice may not even be noticeable to the naked eye, particularly when a transponder having a planar, flat structure is used. Any such distortion, therefore, would not affect the operability of transponder 22 or the ability of patch 20 to remain adhered to the code recipient.

Figure 5:
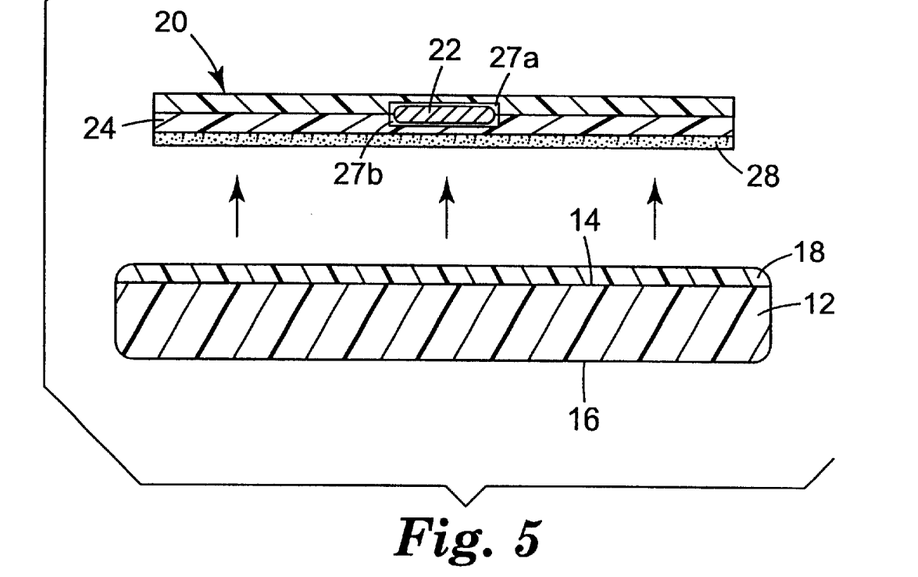
FIG. 5 is an alternative embodiment of a patch of the present invention in which the support and the protective coating are provided with pockets for creating a chamber to receive a transponder.

Even so, it may be desirable in some instances to provide a patch without such distortion in those instances, for example, in which transponder 22 is characterized by a relatively larger size or in which printed information and/or graphics are provided on protective coating 26 and it is desired to avoid any surface irregularities which might otherwise distort such printed information and/or graphics. Accordingly, FIG. 5 shows an embodiment of a patch 20 identical in all respects to patch 20 of FIGS. 1a, 1b, and 2, except that the support 24 and protective coating 26 of FIG. 5 are provided with pockets 27a and 27b, respectively, which form an interior chamber for receiving transponder 22, thus eliminating any distortion of either support 24 or protective coating 26 which might be caused by the placement of transponder 22 between the two members.

Referring again to FIGS. 1a, 1b, and 2, visually observable, human-readable data is disposed on carrier element 12, and this visually observable data comprises a copy 52 of the identification code "1010101010" stored in the memory of transponder 22. In the particular embodiment shown in these Figures, copy 52 is in the form of pre-printed information disposed on first major surface 14 of carrier element 12. Because printing materials do not adhere well to release coating 18, copy 52 and any other visually observable data disposed on the first major surface 14 is generally pre-printed onto first major surface 14 before the release coating is applied.

For illustrative purposes, additional pre-printed information optionally disposed on first major surface 14 includes the letter "T" which represents a trademark which can be applied to carrier element 12 as desired to represent the entity who manufactures and sells assembly 10, the customer who purchases assembly 10, or the like. Of course, the present invention does not require that the additional pre-printed information be included at all or that such information, if present, includes a trademark. Indeed, any kind of additional pre-printed information could be included on carrier element 12 which might convey information of practical use or of interest to the user of assembly 10.

As another preferred feature of the present invention, carrier element 12 includes writeable portion 54 which is disposed on second major surface 16 of carrier element 12 so that one or more users of assembly 10 can add descriptive information to carrier element 12 which relates to the corresponding substrate. For purposes of illustration, for example, writeable portion 54 includes the hand-written terminology "Computer Monitor No. A-1111" which has been written onto writeable portion 54 in order to indicate that patch 20 is or will be adhered to an item of computer equipment designated as "Computer Monitor No. A-1111". Similarly, the information "John Doe" and "Building 111-1N-11" have been written onto writeable portion 54 in order to identify the person and location associated with "Computer Monitor No. A-1111". Because it is generally difficult to apply written information to release coatings with any permanency, writeable portion 54 is advantageously disposed on second major surface 16 which, unlike first major surface 14, does not include a release coating.

Advantageously, after patch 20 is removed from carrier element 12 and applied to the code recipient, carrier element 12 can be separately stored from the code recipient bearing patch 20 to provide a tangible, separate record of the identification code and descriptive information associated with the code recipient. Such separate records are particularly useful for security purposes, calamity purposes, inventory purposes, health care purposes, and the like in the event that the code recipient is moved, stolen, damaged, needs care, and/or is modified.

Figure 6:
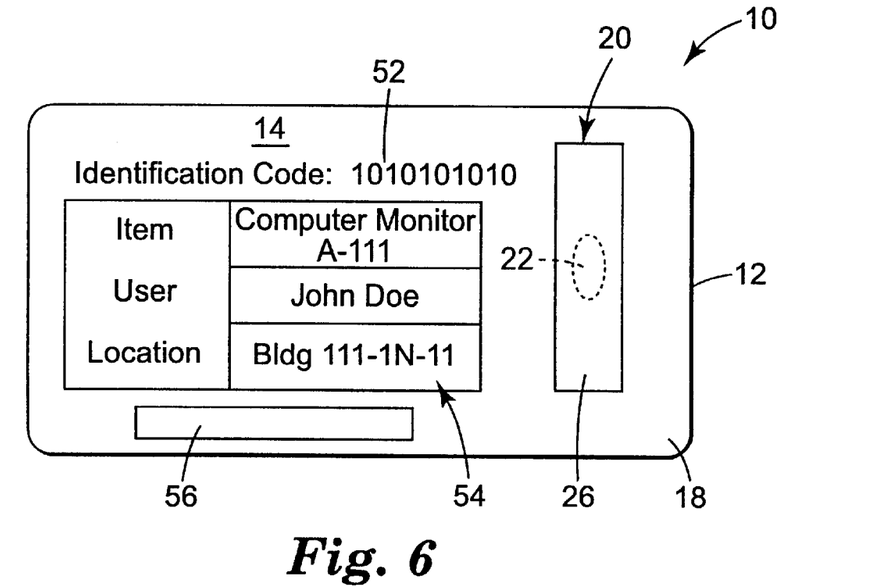
FIG. 6 shows an alternative embodiment of a top plan view of a transponder identification and record assembly of the present invention.

FIG. 6 shows an alternative embodiment 10 of the present invention which is similar to the embodiment 10 of FIGS. 1a, 1b, and 2 in all but three respects. Firstly, the release coating 18 of FIG. 6 overlies only a portion of first major surface 12 proximal to and underlying patch 20. In this way, writeable portion 54 is disposed on first major surface 14 rather than the second major surface (not shown) of carrier element 12. As a third difference, an additional copy 56 of the identification code is disposed on carrier element 12 in machine readable form, e.g., magnetically stored in a magnetic or optical recording medium disposed in or on carrier element 12 analogous to the memory storage elements used on transaction cards. Machine readable copy 56 helps with data entry in those instances in which information records for a number of identification codes and code recipients are to be entered into and stored in a computer database.

Figure 7A:
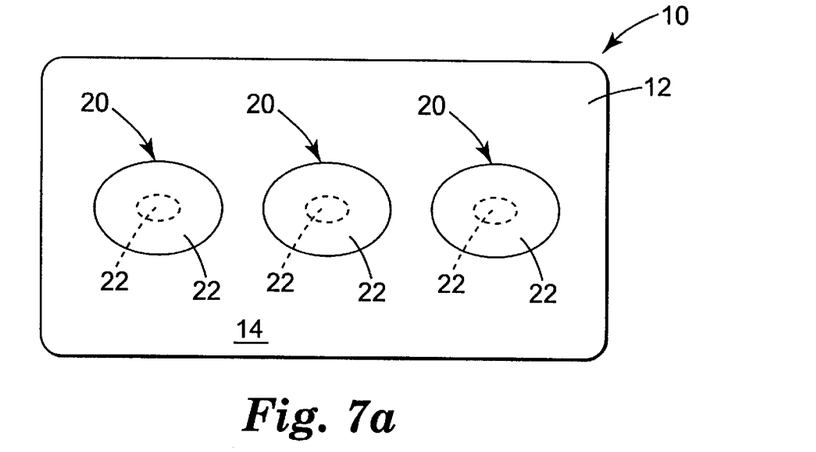
FIG. 7a is a top plan view of an alternative embodiment of the invention in which a plurality of patches are disposed on a carrier element.
Figure 7B:
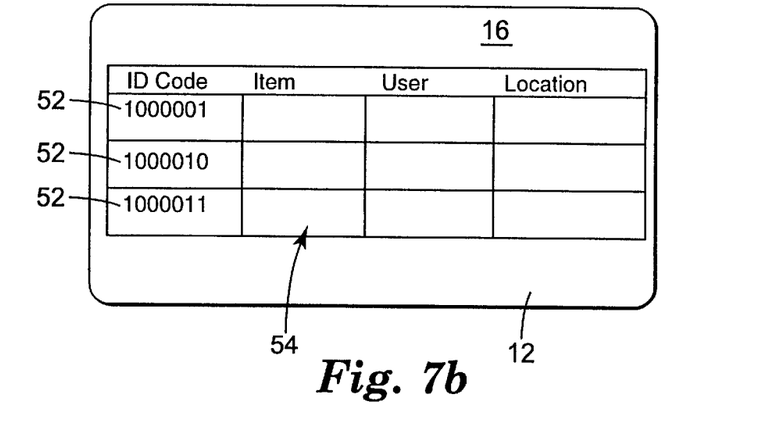

Another embodiment of a transponder identification and record assembly 10 of the present invention is shown in FIGS. 7a and 7b. This embodiment is similar to the embodiment of FIGS. 1a, 1b, and 2 with two exceptions. First, a plurality of patches 20 are disposed on the first major surface 14, and data comprising copies of the corresponding identifications codes is provided on the second major surface 16. As a second difference, whereas patch 20 of FIGS. 1a, 1b, and 2 is rectangular shaped, the patches 20 of FIG. 7a are circularly shaped.

Figure 8:
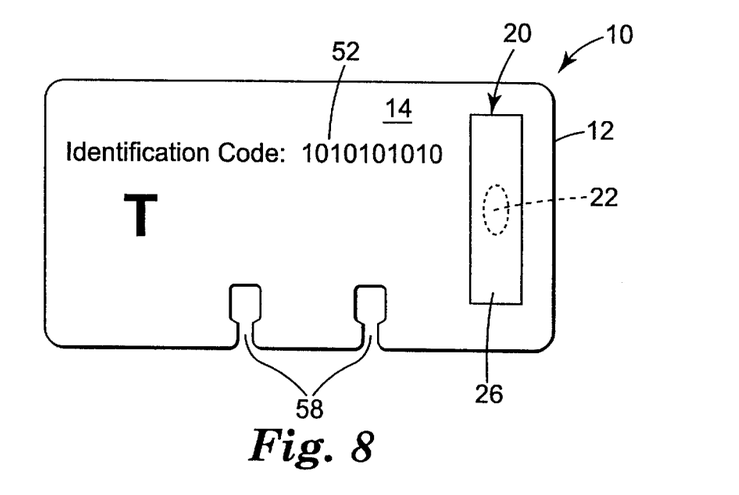
FIG. 8 is a top plan view of an alternative embodiment of a transponder identification and record assembly of the present invention.

Another embodiment of a transponder identification and record assembly 10 of the present invention is shown in FIG. 8. Assembly 10 of FIG. 8 is similar to assembly 10 of FIGS. 1a, 1b, and 2 except that assembly 10 of FIG. 8 includes notches 58 to facilitate storage of carrier element 12 in a "Rolodex" style storage container after patch 20 is removed and adhered to a substrate.

Figure 9:
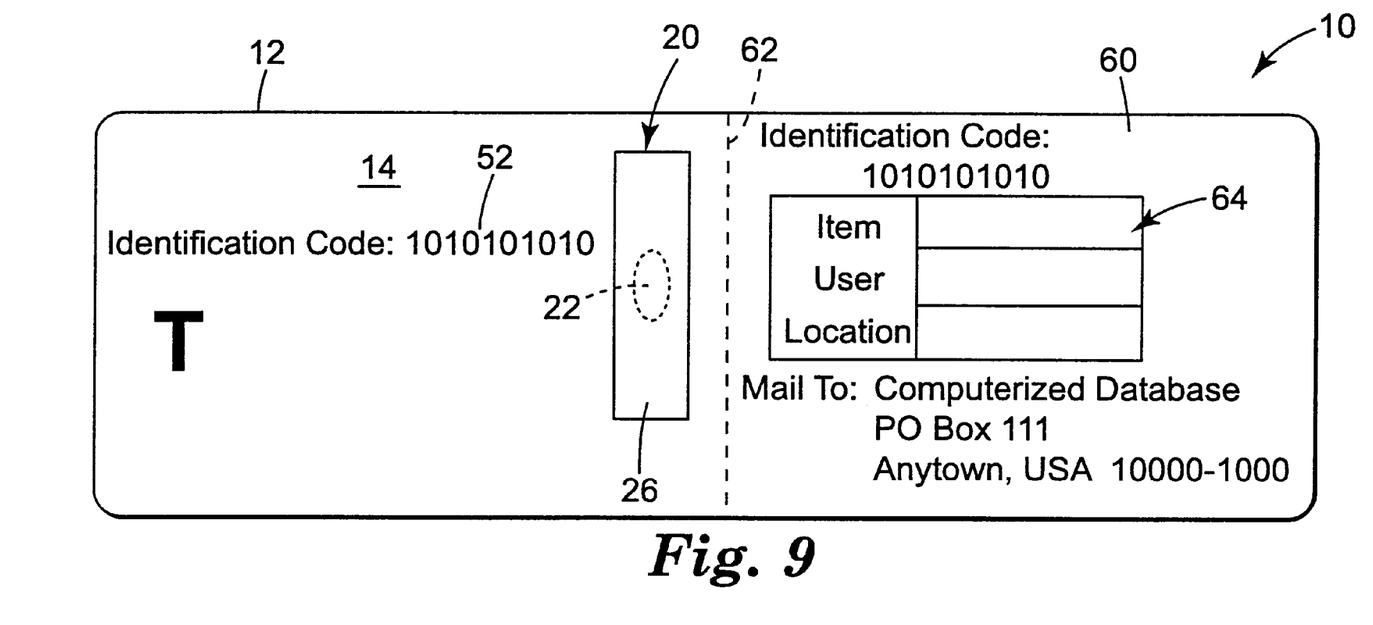
FIG. 9 is a top plan view of an alternative embodiment of the present invention in which a detachable coupon portion is attached to the carrier element.

FIG. 9 shows another embodiment of a transponder identification and record assembly 10 of the present invention similar to assembly 10 of FIGS. 1a, 1b, and 2 except that the carrier element 12 of FIG. 9 includes a detachable coupon portion 60 coupled to the remainder of carrier element 12 along perforation line 62. Detachable coupon portion 60 includes printed information including another copy of the identification code, a writeable portion 64 on which information relating to the substrate and user can be provided, and details comprising a mailing address to which the coupon portion 60 can be mailed after detachment so that information records for the identification code and the substrate/user information can be entered into and stored in a remote, centralized computer database in which a plurality of such records are stored. That is, the database would include a plurality of records containing data representative of a plurality of identification codes and data representative of the code recipient information correspondingly associated with the plurality of identification codes.

The reverse side of coupon portion 60 could have printed information on it as well. For example, such reverse side could be pre-printed like a postcard with an addressee name, address, postage, and the like.

Advantageously, such a database and the records stored in the database would help in the process of returning the lost or stolen property to the owner or other rightful custodian in the event that such property were to be recovered by a third party after being lost or stolen. For example, according to one representative use of the present invention which is for home security applications, a property owner may desire to apply identification information to a variety of items such as stereo equipment, computer equipment, televisions, bicycles, and the like. If so, the property owner could obtain one or more transponder identification and record assemblies containing enough patches 20 to adhere to all such items. For each item, one or more patches 20 would be removed from their carrier elements 12 and then adhered to the item. The property owner preferably would also describe the marked item on the writeable portion 54 of the carrier element 12. Carrier element 12 could then be stored in a separate location for record purposes. Additionally, the property owner can take action to ensure that the information is also inputted into a centralized, computer database. This could be accomplished in a variety of ways such as by contacting the database service provider by phone, internet other network means, or by mailing a coupon portion such as coupon portion 60 in the event assembly 10 is of the type including such a coupon.

Thus, if property bearing a patch 20 were ever lost and then recovered by a third party, the third party could interrogate patch 20 adhered to the property and obtain information comprising the identification code associated with the property and preferably a phone number or other such information for accessing the database or for contacting personnel who have authority to access the database. The identification code obtained from the property could then be used to access the property record of the database corresponding to that identification code. In preferred embodiments of the present invention in which such record comprises information relating to the owner of the property, such information could then be used to return the property to the owner.

The ease with which patches can be adhered to various items and with which carrier elements can be subsequently stored makes the present invention particularly efficient for rapidly developing unique identification records for a large number of items. Consequently, the present invention is also extremely well suited for developing records for business security purposes. For example, to help protect valuable business properties, such as artwork, computer equipment, and the like, such items could be marked with patches in accordance with the present invention. The patches advantageously could be placed in hidden locations out of view. A written description of each item, its designated user if any, and designated location could be provided on the corresponding carrier element after which the carrier element can be stored in a safe location. Additionally, it is also extremely desirable to input the identification code and description of each item as one or more records in a computerized database. With patches appropriately applied to such items, interrogator units could be placed at passageways leading into and out of designated areas in order to detect the passage of marked items. If the transport of an item is detected, then the identification code for the detected item can be used to access the carrier element record and/or the computer database record corresponding to the identification code. The record can then be reviewed to determine if transport for the item is authorized or not. Appropriate action could then be taken to recover the item if transport is not authorized.

Advantageously, this procedure can be fully automated. For example, the database records of the marked items can include a data field indicating whether transport for an item during a particular time period and through particular passageways, if desired, is authorized or not. Then, when transport of the item is detected, security programming can automatically access the record to determine the authorization status for the item. If transport is not authorized, passage doorways could remain closed, and an alarm could be triggered at an appropriate security location. Security is enhanced if transponder surveillance is used in combination with video surveillance so that a video record of the person transporting an item without authorization could also be obtained.

The present invention is also particularly suitable for animal identification and record keeping applications. For example, a patch of the present invention could be adhered directly to an animal or to an item, such as a collar or tag, worn by the animal. Information relating to the animal, such as health care information, feeding instructions, vaccination information, and the like, could then be entered onto the corresponding carrier element and/or into a corresponding computerized database record(s) for the animal. Such record(s) are easily accessed and updated, as desired, by interrogating the transponder incorporated into the patch in order to obtain the animal's unique identification code.

The present invention is also particularly suitable for human patient identification and record keeping applications. For example, a patch of the present invention could be removed from its carrier element and then adhered directly to a patient or to an item worn by the patient when the patient enters a health care facility for treatment. Information relating to the patient, such as history, treatment records, diagnosis, prescriptions, scheduling, or the like could then be entered onto the corresponding carrier element and/or into a corresponding computerized data base record(s) for the patient. Such record(s) are easily accessed and updated, as desired, by interrogating the transponder incorporated into the patch in order to obtain the patient's unique identification code. Advantageously, determining the patient's identification code and inputting such a code into a database in order to obtain the patient(s) records can be fully automated. As a result, manual determination and entry of patient identification codes is not required, thus minimizing the chances that an erroneous code could be used to obtain the wrong health care record.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A transponder identification and record assembly suitable for associating an identification code with a code recipient and for maintaining an independent record of the identification code associated with the code recipient, comprising:
- a carrier element;
- a patch releasably disposed on the carrier element, wherein the patch is provided with an adhesive coating such that the patch is adherable to the code recipient after the patch is removed from the carrier element, wherein the patch comprises a transponder which stores information comprising the identification code, and wherein the transponder can be remotely interrogated to obtain the identification code; and
- a data record disposed on the carrier element separate from the patch such that the data record is retained on at least a portion of the carrier element after the patch is removed from the carrier element, said data record including information which comprises a copy of the identification code such that, after the patch is removed from the carrier element and adhered to the code recipient, the carrier element bearing said data record can be separately stored from the code recipient bearing the patch to provide a tangible, separate record of the identification code associated with the code recipient wherein the data record further comprises substantive information relating to the code recipient associated with the identification code, wherein the carrier element serves as both a release liner for the patch and a separately storable document after the patch is removed.

2. The assembly of claim 1, wherein the data record is data printed onto the carrier element.

3. The assembly of claim 2, wherein the carrier element comprises first and second major opposed surfaces, wherein the patch is releasably disposed on the first major surface of the carrier element, and wherein at least a portion of the data record is disposed on the second major surface of the carrier element.

4. The assembly of claim 2, wherein the carrier element comprises first and second major opposed surfaces, and wherein the patch is releasably disposed on the first major surface of the carrier element, and wherein at least a portion of the data record is also disposed on the first major surface of the carrier element.

5. The assembly of claim 1, wherein the carrier element further comprises a detachable coupon portion removably connected to the remainder of the carrier element, and wherein the coupon portion comprises a copy of the identification code.

6. The assembly of claim 1, further comprising a computerized database comprising a plurality of code recipient records stored in the database, wherein said records correspond to a plurality of code recipients, each of said code recipients being associated with a particular identification code such that the particular identification code can be used to access the code recipient record of the corresponding code recipient.

7. The assembly of claim 6, wherein the plurality of the code recipient records each comprise data representative of whether transport of the corresponding code recipient is authorized, and wherein the assembly further comprises an interrogation unit disposed in a position effective for detecting transport of a code recipient past the interrogation unit.

8. The assembly of claim 7, further comprising an alarm operationally coupled to the interrogation unit such that the alarm is triggered when the interrogation unit detects an unauthorized transport of a code recipient.

9. The assembly of claim 7, further comprising a video recording apparatus operationally coupled to the interrogation unit such that the video recording apparatus is operated to record the unauthorized transport of a code recipient past the interrogation unit.

10. The assembly of claim 1, wherein the transponder comprises a memory, and wherein the identification code is disposed in the memory.

11. The assembly of claim 10, wherein the memory is a write once/read many type of memory.

12. The assembly of claim 10, wherein the memory is a read/write type of memory.

13. The assembly of claim 10, wherein the transponder is externally powerable through wireless engagement with an interrogator unit.

14. The assembly of claim 10, wherein the transponder comprises an internal power source.

15. The assembly of claim 10, wherein the patch comprises
- a support comprising first and second major opposed surfaces, wherein the transponder is disposed on the first major opposed surface of the support;
- a protective cover overlying at least the transponder; and
- an adhesive layer disposed on the second major opposed surface of the support for adhering the patch to the code recipient.

16. The assembly of claim 5, wherein the coupon portion includes a writeable portion on which information relating to the code recipient can be provided.

17. The assembly of claim 1, wherein the carrier element comprises a writeable portion so that the substantive information can be provided on the carrier element by a user.

18. The assembly of claim 1, wherein an additional copy of the identification code is incorporated into said assembly in a machine readable format.

19. The assembly of claim 1, wherein the code recipient is a human.

20. The assembly of claim 1, wherein the code recipient is an animal.

21. The assembly of claim 1, wherein the code recipient is an object.

22. A method of providing a system suitable for associating an identification code with a code recipient and maintaining an independent record of the identification code associated with the code recipient, comprising the steps of:
  (a) providing an identification system comprising
    (i) a carrier element;
    (ii) a patch releasably disposed on the carrier element, wherein the patch is provided with an adhesive coating such that the patch is adherable to the code recipient after the patch is removed from the carrier element, wherein the patch comprises a transponder which stores information comprising the identification code, and wherein the transponder can be remotely interrogated to obtain the identification code; and
    (iii) a data record disposed on the carrier element separate from the patch such that such that, after the patch is removed from the carrier element and adhered to the code recipient, the carrier element bearing said data record can be separately stored from the code recipient bearing the patch to provide a tangible, separate record of the identification code associated with the code recipient wherein the data record further comprises substantive information relating to the code recipient associated with the identification code;
  (b) removing the patch from the carrier element wherein the carrier element serves as both a release liner for the patch and a separately storable document after the patch is removed;

(c) adhering the patch to the substrate; and (d) storing the carrier element in a location separate from the code recipient to thereby provide a separate record of the identification code associated with the code recipient.

23. The method of claim 22, wherein the carrier element comprises a writeable portion so that the substantive information can be provided on the carrier element by a user.

24. The method of claim 22, wherein an additional copy of the identification code is incorporated into said assembly in a machine readable format.

25. The method of claim 22, wherein the transponder comprises a memory, and wherein the identification code is disposed in the memory.

26. The method of claim 25, wherein the memory is a write once/read many type of memory.

27. The method of claim 25, wherein the memory is a read/write type of memory.

28. The method of claim 25, wherein the transponder is externally powerable through parasitic, wireless engagement with an interrogator unit.

29. The method of claim 25, wherein the transponder comprises an internal power source.

30. The method of claim 22, wherein the assembly further comprises a detachable coupon portion removably connected to the carrier element and wherein the coupon portion comprises a copy of the identification code either before or after the coupon portion is removed from the carrier element.

31. The method of claim 30, wherein the coupon portion includes a writeable portion on which information relating to the code recipient can be provided.

32. The method of claim 22, wherein the information element is printed information provided on the carrier element.

33. The method of claim 32, wherein the carrier element comprises first and second major opposed surfaces, wherein the patch is releasably disposed on the first major surface of the carrier element, and wherein at least a portion of the data record is disposed on the second major surface of the carrier element.

34. The method of claim 32, wherein the carrier element comprises first and second major opposed surfaces, and wherein the patch is releasably disposed on the first major surface of the carrier element, and wherein at least a portion of the data record is also disposed on the first major surface of the carrier element.

35. The method of claim 22, wherein the code recipient is a human.

36. The method of claim 22, wherein the code recipient is an animal.

37. The method of claim 22, wherein the patch comprises a support comprising first and second major opposed surfaces, wherein the transponder is disposed on the first major opposed surface of the support;

a protective cover overlying the transponder; and an adhesive layer disposed on the second major opposed surface of the support for adhering the patch to the substrate.

38. The method of claim 22, further comprising the step of inputting a code recipient record for the code recipient into a computerized database, wherein the database comprises a plurality of code recipient records stored in the database, wherein said records correspond to a plurality of code recipients, each of said code recipients being associated with a particular identification code such that the particular identification code can be used to access the code recipient record of the corresponding code recipient.

39. The method of claim 38, wherein the plurality of the code recipient records each comprise data representative of whether transport of the corresponding code recipient is authorized, and wherein the method further comprises interrogating at least one of the code recipients to determine whether transport of said at least one code recipient is authorized.

40. The method of claim 39, further comprising the step of triggering an alarm when the interrogation unit detects an unauthorized transport of said at least one code recipient.

41. The method of claim 39, further comprising using video surveillance to record video information relating to the unauthorized transport of said at least one code recipient.

42. The method of claim 38, wherein the code recipient is a human.

43. The method of claim 38, wherein the code recipient is an animal.

44. The method of claim 38, wherein the code recipient is an object.

45. The method of claim 22, wherein the code recipient is an object.

46. A method of providing a centralized system suitable for associating a plurality of identification codes with a plurality of corresponding code recipients and maintaining a record of which identification code is associated with each code recipient, comprising the steps of:

(a) providing an identification system comprising (i) a carrier element;

(ii) a patch releasably disposed on the carrier element, wherein the patch is provided with an adhesive coating such that the patch is adherable to the code recipient after the patch is removed from the carrier element, wherein the patch comprises a transponder which stores information comprising the identification code, and wherein the transponder can be remotely interrogated to obtain the identification code; and (iii) a data record disposed on the carrier element separate from the patch such that such that, after the patch is removed from the carrier element and adhered to the code recipient, the carrier element bearing said data record can be separately stored from the code recipient bearing the patch to provide a tangible, separate record of the identification code associated with the code recipient wherein the data record further comprises substantive information relating to the code recipient associated with the identification code;

(b) removing the patch from the carrier element wherein the carrier element serves as both a release liner for the patch and a separately storable document after the patch is removed;

(c) adhering the patch to the code recipient; and (d) inputting a code recipient record into the database in a manner such that the identification code can be used to access said record.

47. The method of claim 46, further comprising repeating steps (a) through (d) for at least one additional identification code and at least one additional code recipient to be associated with the at least one additional identification code.

48. The method of claim 46, further comprising determining the identification code or a code recipient by interrogating the code recipient and using the identification code to access the corresponding code recipient record.

49. The method of claim 46, wherein the database comprises a plurality of code recipient records stored in the database, wherein said records correspond to a plurality of code recipients, each of said code recipients being associated with a particular identification code such that the particular identification code can be used to access the code recipient record of the corresponding code recipient.

50. The method of claim 49, wherein the plurality of the code recipient records each comprise data representative of whether transport of the corresponding code recipient is authorized, and wherein the method further comprises interrogating at least one of the code recipients to determine whether transport of said at least one code recipient is authorized.

51. The method of claim 50, further comprising the step of triggering an alarm when the interrogation detects an unauthorized transport of said at least one code recipient.

52. The method of claim 51, further comprising using video surveillance to record video information relating to the unauthorized transport of said at least one code recipient.

* * * * *

UNITED STATES PATENT AND TRADEMARK OFFICE
CERTIFICATE OF CORRECTION

PATENT NO.      : 6,297,727 B1                                          Page 1 of 1
DATED           : October 2, 2001
INVENTOR(S)     : George N. Nelson, Jr.

It is certified that error appears in the above-identified patent and that said Letters Patent is hereby corrected as shown below:

Column 12,
Line 56, delete the second phrase -- such that, --.
Line 56, after the word "that" insert -- the data record is retained on at least a portion of the carrier element --.
Line 57, after the word "element" insert -- , said data record including information which comprises a copy of the identification code such that, after the patch is removed from the carrier element --.

Column 14,
Line 42, delete the second phrase -- such that, --.
Line 42, after the word "that" insert -- the data record is retained on at least a portion of the carrier element --.
Line 43, after the word "element" insert -- , said data record including information which comprises a copy of the identification code such that, after the patch is removed from the carrier element --.

Signed and Sealed this

Eighteenth Day of June, 2002

*Attest:*

*Attesting Officer*

JAMES E. ROGAN
*Director of the United States Patent and Trademark Office*